(12) United States Patent
Sumiyoshi

(10) Patent No.: US 8,636,632 B2
(45) Date of Patent: Jan. 28, 2014

(54) SLEEVE ROLL

(75) Inventor: Koji Sumiyoshi, Kashiwa (JP)

(73) Assignee: Chiba Machine Industry Corporation, Chiba (JP)

( * ) Notice: Subject to any disclaimer, the term of this patent is extended or adjusted under 35 U.S.C. 154(b) by 232 days.

(21) Appl. No.: 13/056,005

(22) PCT Filed: May 26, 2010

(86) PCT No.: PCT/JP2010/058924
§ 371 (c)(1),
(2), (4) Date: Jan. 26, 2011

(87) PCT Pub. No.: WO2011/013439
PCT Pub. Date: Feb. 3, 2011

(65) Prior Publication Data
US 2011/0136638 A1 Jun. 9, 2011

(30) Foreign Application Priority Data
Jul. 29, 2009 (JP) ................................ 2009-176486

(51) Int. Cl.
*B05C 11/00* (2006.01)
*B25F 5/02* (2006.01)

(52) U.S. Cl.
USPC ............................................. 492/48; 492/42

(58) Field of Classification Search
USPC ..................... 492/6–7, 16–20, 42, 48
See application file for complete search history.

(56) References Cited

U.S. PATENT DOCUMENTS

| | | | |
|---|---|---|---|
| 4,237,592 A * | 12/1980 | Kuge et al. | 492/25 |
| 4,563,245 A * | 1/1986 | Wanke et al. | 162/358.3 |
| 4,850,088 A * | 7/1989 | Speak | 492/7 |
| 5,141,601 A * | 8/1992 | Karlsson et al. | 162/358.3 |
| 5,240,666 A * | 8/1993 | Schnyder et al. | 264/175 |
| 5,316,798 A * | 5/1994 | Tittgemeyer | 427/409 |
| 5,424,352 A * | 6/1995 | Watanabe | 524/433 |
| 5,984,689 A * | 11/1999 | Dong | 439/64 |
| 6,077,065 A * | 6/2000 | Sumiyoshi et al. | 425/368 |
| 6,468,461 B1 * | 10/2002 | Sumiyoshi et al. | 264/280 |

FOREIGN PATENT DOCUMENTS

| | | |
|---|---|---|
| JP | 4-82725 | 3/1992 |
| JP | 9-76365 | 3/1997 |
| JP | 10-249916 | 9/1998 |
| JP | 11-314263 | 11/1999 |
| JP | 2007-296828 | 11/2007 |
| JP | 2007296828 A * | 11/2007 |
| WO | WO-2004/035917 A1 | 4/2004 |

OTHER PUBLICATIONS

Chinese Office Action dated Sep. 27, 2013 from corresponding Chinese national stage patent application of PCT/JP2010/058924, pp. 1-2.

* cited by examiner

*Primary Examiner* — David Bryant
*Assistant Examiner* — Jacob Cigna
(74) *Attorney, Agent, or Firm* — Cesari and McKenna, LLP

(57) ABSTRACT

The sleeve roll according to the present invention has the metallic sleeve 5 fitted over the rubber roll 4, covering the surface of the shaft core part 2, and can be efficiently heated or cooled by having the passage P formed between the metallic roll inner tube 2*a* and the metallic roll outer tube 2*b* for the thermal medium to flow through. It also has the heat conductive material 6 mixed into the rubber roll 4, so that it has excellent heat conductivity and the surface of the sleeve can be quickly and efficiently heated or cooled, thus preventing the material to be formed from sticking to the roll.

4 Claims, 4 Drawing Sheets

SLEEVE ROLL

CROSS REFERENCE TO RELATED APPLICATIONS

This application is a National Stage of International Application No. PCT/JP2010/058924, filed on May 26, 2010, which claims priority to Japanese Application No. 2009-76486 filed Jul. 29, 2009. The content of the prior applications are incorporated herein by reference in their entirety.

TECHNICAL FIELD

The present invention relates to a sleeve roll to be used for an extrusion film sheet forming apparatus, a lamination pinching apparatus, etc.

BACKGROUND TECHNOLOGY

An extrusion film sheet forming apparatus, a lamination pinching apparatus, and the likes have been used as an apparatus for forming film-like sheets of synthetic resins. The extrusion film sheet forming apparatus is used for rolling a molten synthetic resin material into a film-like sheet and a lamination pinching apparatus is used for applying pressure to laminated film-like sheets to cause pressure-bonding of the sheets.

A metal or rubber roll is often used for such a rolling or pressure-bonding process. For example, the extrusion film sheet forming apparatus has a pressure-bonding roll, a cast roll provided in opposition to the pressure-bonding roll, and a drive unit to rotate the cast roll. With such a configuration, a thin film-like sheet made of a synthetic resin material is formed by feeding the synthetic resin material in a molten state between the pressure-bonding roll and the cast roll thus causing the material to be pressured between the two rolls. The cooling of the two rolls is accomplished by feeding a cooling medium inside either of the rolls.

When the metallic roll is used as a pressure-bonding roll used in such an apparatus, it may cause the thickness of the film-like sheet made of a resin material, which is the material being formed, thinner, as the roll itself does not provide flexibility in the radial direction, and it may be difficult to execute the rolling or pressure-bonding process properly if there is any thickness inaccuracy along the width direction of the roll.

On the other hand, when the rubber roll is used as a pressure-bonding roll, a pressure-bonding or rolling does not cause any unevenness of the thickness in the film-like sheet thus produced thanks to the flexibility of the roll in the radial direction. However, the rubber roll cannot be used if the temperature of the material to be formed is high. For example, if the temperature of the rubber roll rises during the pressure-bonding or rolling, the material to be formed may stick or get wrapped around the roll, making the forming impossible. In particular, when the roll surface is made of rubber, it is practically impossible to produce mirror finish like a metallic surface or transfer sculptured patterns from the roll.

In order to cope with such a problem, an extrusion sheet forming roll equipped with a rubber layer on the outer periphery of a shaft core part, a tubular member provided on the outer periphery of said rubber layer, and a metallic film to cover the surface of said tubular member, is disclosed in the Publication of Japanese Patent No. 3795999.

This extrusion sheet forming roll is used for the extrusion forming of a plastic sheet made of thermoplastic resin having a flat and smooth surface at least on one side. Such a roll is made by forming a seamless tubular metallic member from a material mainly consisting of Nickel by the electrocasting method, covering the outside of the tubular metallic member with a film primarily consisting of Chromium, and inserting a rubber layer to cover the shaft core part into the tubular metallic member by the shrink-fitting method so that it would be affixed solidly due to the friction force when it cools down to the normal temperature.

This extrusion sheet forming roll, however, has a problem that it cannot be cooled quickly when it is intended to cool the high temperature of the tubular metallic member with the cooling medium from the shaft core part side, as the shaft core part is covered by the heat insulating rubber layer. Consequently, the material to be formed may get stuck on the extrusion sheet forming roll during the forming of the film sheet, making it difficult to form the film sheet. It also makes the transfer of the pattern sculptured on the roll to the sheet difficult.

Furthermore, the high temperature of the material to be formed may cause the tubular metallic member to expand thermally, thus causing the tubular member to expand circumferentially and axially, allowing the tubular member to offset axially or rotate in the circumferential direction. As a result, distortion, or even damage, may develop in the tubular metallic member.

DISCLOSURE OF THE INVENTION

It is an objective of the present invention to provide a sleeve roll having an excellent heat conductivity so that its surface can be heated or cooled at will quickly and efficiently, thus being able to effectively isolate it from the temperature of the material to be formed and prevent the material to be formed from sticking to the roll surface.

The sleeve roll according to the present invention intended to accomplish the stated objective is characterized in having a shaft core part comprising of a metallic roll in which a passage is formed for a thermal medium to flow through, a rubber roll containing a heat conductive material, which is provided on the surface of the shaft core part, and a thin-walled tubular sleeve fitted on the outside of the rubber roll.

As this sleeve roll has the rubber roll mixed with the heat conductive material, it allows the sleeve to be heated or cooled more efficiently by means of a thermal medium that flows through the thermal medium passage provided in the shaft core part during the pressure-bonding or rolling process of the material to be formed, allowing the sleeve surface to be more rapidly and efficiently controlled to be heated or cooled, i.e., the sleeve surface to be temperature controlled in a more stable manner, and consequently more securely preventing the sticking of the material to be formed onto the roll surface. Moreover, the presence of the thin metallic sleeve on the top layer allows the transfer of a sculptured pattern to the material being processed.

Said shaft core part has a dual tubular structure consisting of a metallic roll inner tube and a metallic roll outer tube characterized in that a thermal medium passage it formed to allow the thermal medium to flow through between the metallic roll inner tube and metallic roll outer tube.

Being constituted in such a manner, it is capable of securing a large heat conductive area to be able to control the heating or cooling of the sleeve surface more rapidly and efficiently.

It can also be constituted in such a manner to provide a crosswise offset prevention device between the shaft core part and the sleeve for automatically repositioning the sleeve to its original position in the horizontal direction if an offset occurs.

As such a crosswise offset prevention device makes the sleeve to return to its original position if an offset of the sleeve relative to the shaft core part occurs, it can securely prevent the positional offset of the sleeve that may occur during the process of pinching, forming and transferring a long film sheet.

This crosswise offset prevention device is characterized in that a tension spring mounted on a tubular support shaft formed on each end of said shaft core part is covered by a tension adjust member mounted on said support shaft, so that the tension spring can be affixed with bolts that are inserted through the tension adjust member, while a ring shaped retention collar affixed to the outer fringe of the end opening of said sleeve holds the sleeve against the tension adjust member.

When the sleeve develops a positional offset relative to the shaft core part in the horizontal direction, such a crosswise offset prevention device self-returns the sleeve to its original position by means of the repulsive force of the tension spring against its contraction and expansion, thus correcting the positional offset of the sleeve along the axial direction relative to the shaft core part and maintaining its correct position at all time. Therefore, the sleeve can be mechanically held in its original position without needing any external control.

It can also be constituted in such a manner to provide a rotary offset absorption device between the shaft core part and the sleeve for automatically repositioning the sleeve to its original position in the rotational direction if an offset occurs.

Even if the sleeve made of metal expands in the circumferential or axial direction as a result of its thermal expansion due to the temperature of the material to be formed, the positional offset in the rotary direction of the sleeve can be absorbed by the rotary offset absorption device so that it can prevent any negative effect, such as strains or damages, on the sleeve otherwise may be caused by the temperature of the material to be formed.

This rotary offset absorption device is characterized in that its comprising a sleeve fixing collar mounted rotatably on a tubular support shaft formed on each end of said shaft core part, and a rotary displacement plate provide facing against the end face of said shaft core part across a bearing, so that a tension spring provided between the sleeve fixing collar and said rotary displacement plate is affixed by bolts that are inserted through said sleeve fixing collar.

Such a rotary offset absorption device absorbs a positional offset in the rotational direction due to a thermal expansion of the sleeve by absorbing it by the rotational displacement of the rotary displacement plate and the sleeve fixing collar can mechanically prevent positional offset without any means of control.

The objects, characteristics and properties of this invention other than those set for the above will become apparent from the description given herein below with reference to preferred embodiments illustrate in the accompanying drawings.

EMBODIMENTS OF THE INVENTION

The embodiments of the present invention will be described below with reference to the accompanying drawings.

Figure 1:
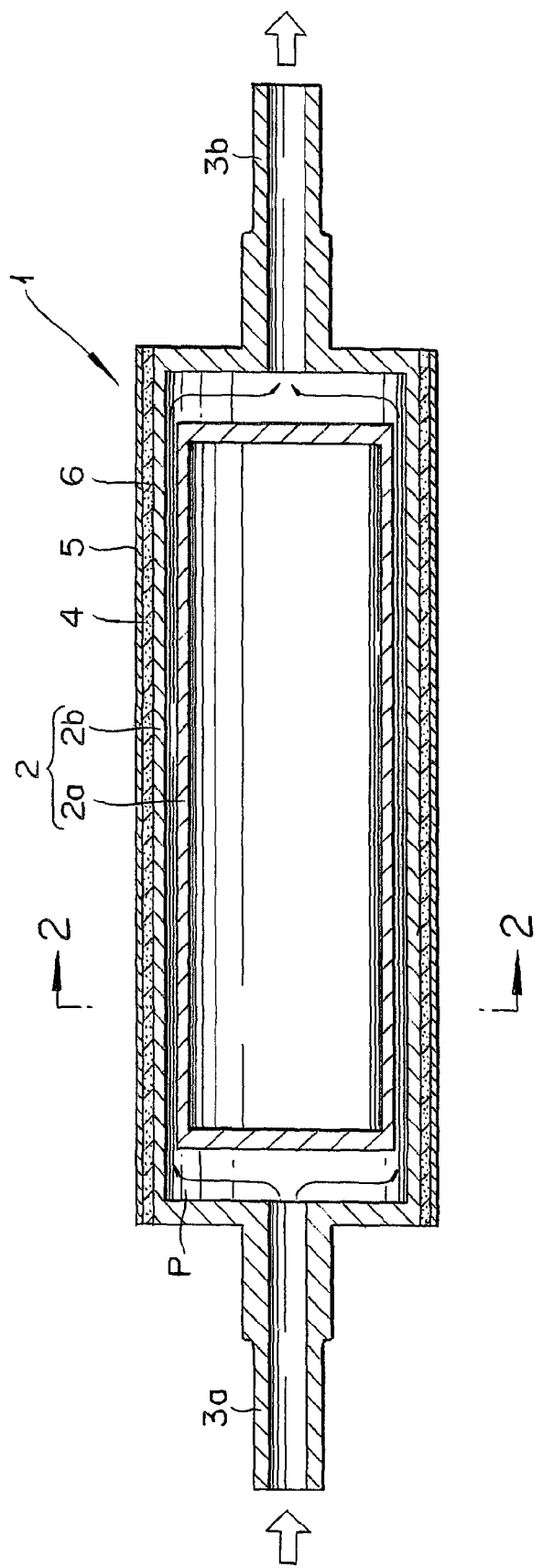
FIG. 1 is a cross-sectional drawing showing an example of the sleeve roll of an embodiment of the present invention.
Figure 2A:
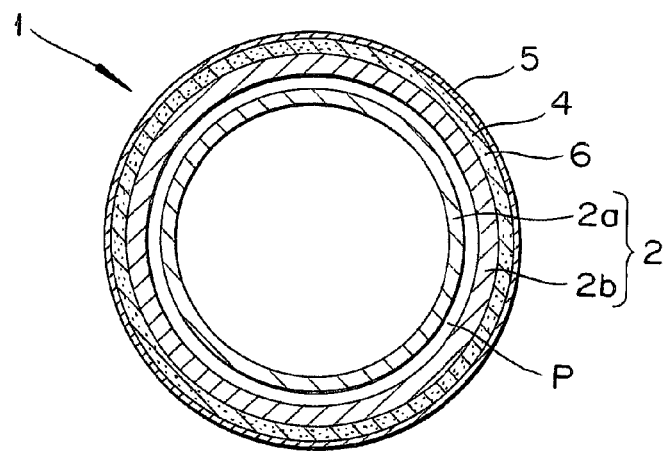
FIG. 2 shows an example of the particular sleeve roll, where (A) is the cross-sectional drawing along the 2-2 line of FIG. 1, while (B) is an enlarged cross-sectional drawing of its main part.
Figure 2B:
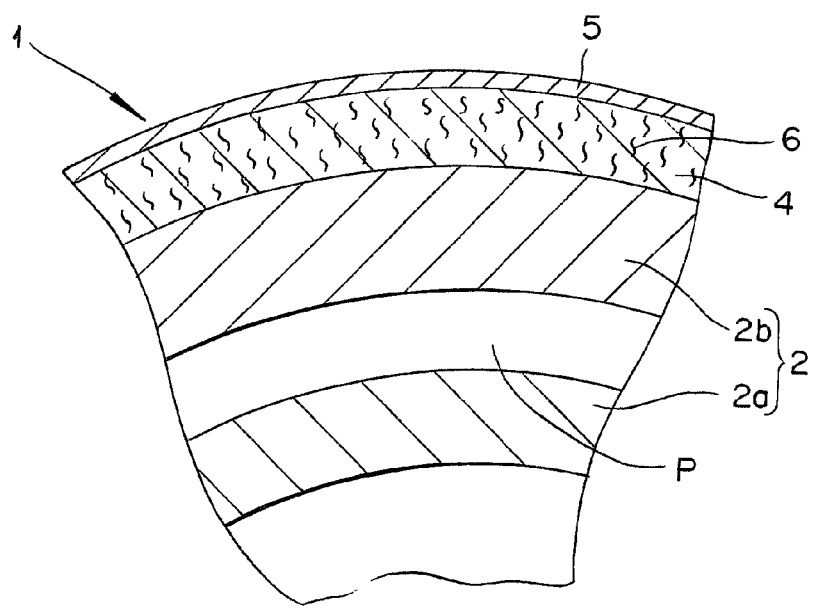

As shown in FIG. 1 and FIG. 2, the sleeve roll 1 of the present embodiment is constructed of a shaft core part 2 having a dual tubular structure in which a passage P is formed for a heating or cooling thermal medium to flow between a metallic roll inner tube 2a and a metallic roll outer tube 2b, a rubber roll 4 provided to cover the surface of the shaft core part 2, and a thin wall tubular metallic sleeve 5 fitted on the outside of the rubber roll 4.

On both ends of the metallic roll outer tube 2b provided are slender tubular support shafts 3a and 3b, one of which tubular support shaft 3a is the inlet and the other tubular support shaft 3b is the outlet of the thermal medium.

In the present embodiment, the shaft core part 2 has a dual tubular structure in order to form internally the passage P, thus providing a large thermal conductive area in order to be able to control heating or cooling of the sleeve surface more quickly and efficiently. However, the present invention shall not be limited to such a construction, but rather shall be able to be configured arbitrarily depending on various objectives by constituting the shaft core part, e.g., as a single tubular structure, or a dual tubular structure having a screw groove provided in each of the inner surfaces in order to achieve a more uniform temperature to be achieved by the thermal medium. Also, in place of forming a passage P, it can be constituted with a heating temperature control method having an electrical heating device inside the shaft core part 2.

The rubber roll 4 according to the present embodiment contains in its inside a heat conductive material 6 to increase its heat conductivity.

Any material that has higher heat conductivity than the heat conductivity of the rubber roll 4 can be used as the heat conductive material 6. Specifically, materials such as metals (including alloys), e.g., silver, copper, gold, aluminum, metallic silicon, brass, iron, platinum, stainless steel, and cerium; metal oxides, e.g., titanium oxide, magnesium oxide, zinc oxide, iron oxide, cerium oxide, and silicon oxide; metal hydroxides, e.g., cerium hydroxide; carbon materials, e.g., carbon fibers (carbon fibers of pitch group), carbon nanotube, carbon nanohone, and fullerene; glass; and synthetic resins, e.g., polytetrafluoroethylene, Nylon 6 (registered trademark), polyethylene, and epoxyresin, etc., but not limited to them are those that can be used. They can be used singularly or as a mix of two or more kinds.

As to its shape, the heat conductive material 6 can be of arbitrary shapes, e.g., powder (granular), flaky (scaly), line- or rod-shaped, cylindrical or prism shaped, coil-shaped, irregular shape, or any other shapes, and does not have to be of any specific shape, so long as it has a shape that enhances the heat conductivity when it is mixed in the rubber roll. These materials can be used singularly, or as a mix of two or more kinds.

As to the size of the above heat conductive material 6, it is not limited to any particular size so long as it can contribute to enhancing the heat conductivity as well as to additional rubber hardness and rubber durability when the material is mixed with the rubber roll 4.

It is preferable that the heat conductive material 6 be thin wires made from the above-mentioned metals, metal oxides, carbon materials, synthetic resins, and the likes cut to a length of a few millimeters.

The shapes, e.g., thickness and lengths of the thin wires, mixing amount, style of mixing or dispersion, or properties of the heat conductive material 6 shall be determined according to the rubber's hardness or the rubber's durability required in the end.

Furthermore, the surface of the heat conductive material 6 can be processed (covered) by an organic silicon compound, e.g., organo-alkoxysilane, organo-silazane, silanol or organo-polysiloxane containing alkoxy group, etc. For example, the surface of the heat conductive material 6 such as fine powder of alumina, fine powder of iron oxide, fine powder of cerium oxide, fine powder of cerium hydroxide, etc., can be processed (by reaction) with liquid diorgano-polysiloxane, etc., to cover the particular surface with the particular organic silicon compound. Such a process (coating) of the organic silicon compound improves the compatibility of the material to be mixed with the rubber roll 4, making it to be able to be mixed more quickly. As a result, it makes it possible to make the heat conductive material 6 to be more uniformly dispersed throughout the rubber roll 4. Furthermore, even when an external load is applied during its use, it effectively attenuate the reduction of the heat conductivity due to surface peeling, etc., as it provides an excellent adhesiveness of the interface between the rubber roll 4 and the heat conductive material 6.

Although silicone rubber having heat resistance or wear resistant NBR (nitrite butadiene rubber; nitrile rubber), etc., are used preferably for the rubber roll 4, any other materials can be used so long as they offer higher heat resistance than that of the film sheet material of synthetic resin used as the material to be formed in that regard.

The shapes, e.g., thickness and lengths of the thin wires, mixing amount, style of mixing or dispersion, or properties of the heat conductive material 6 shall be determined according to the rubbers hardness or the rubber's durability required in the end, and not to be limited to those that are shown here.

The metallic sleeve 5 can be made from, for example, a nickel pipe made by the electrocasting method. Its thickness can be as thin as 200 μm-500 μm, for example, while the surface of the material can be coated with a mixture of hard chromium plating, diamond-like carbon (DLC), chromium nitride and fluorinated resin depending on the purpose of its use.

The material, manufacturing method, and surface coating of the sleeve 5 are not limited to those mentioned above. The surface of the sleeve 5 can be mirror finished, or mat finished by means of sand blasting, or added with sculptured patterns, etc.

The sleeve roll 1 according to the present embodiment is equipped with the crosswise offset prevention device 11 for preventing the crosswise move of the sleeve 5 and the rotary offset absorption device 40 for absorbing the move in the rotary direction during its use.

Figure 3:
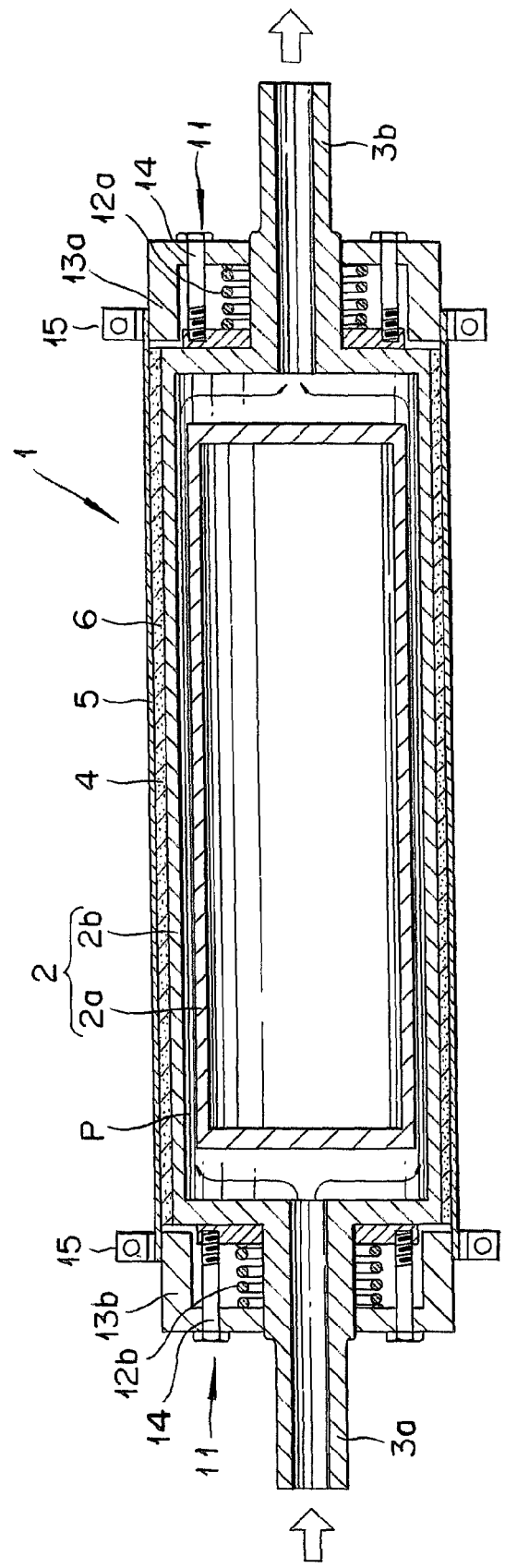
FIG. 3 is a cross-sectional drawing of the particular sleeve roll equipped with the crosswise offset prevention device.
Figure 4:
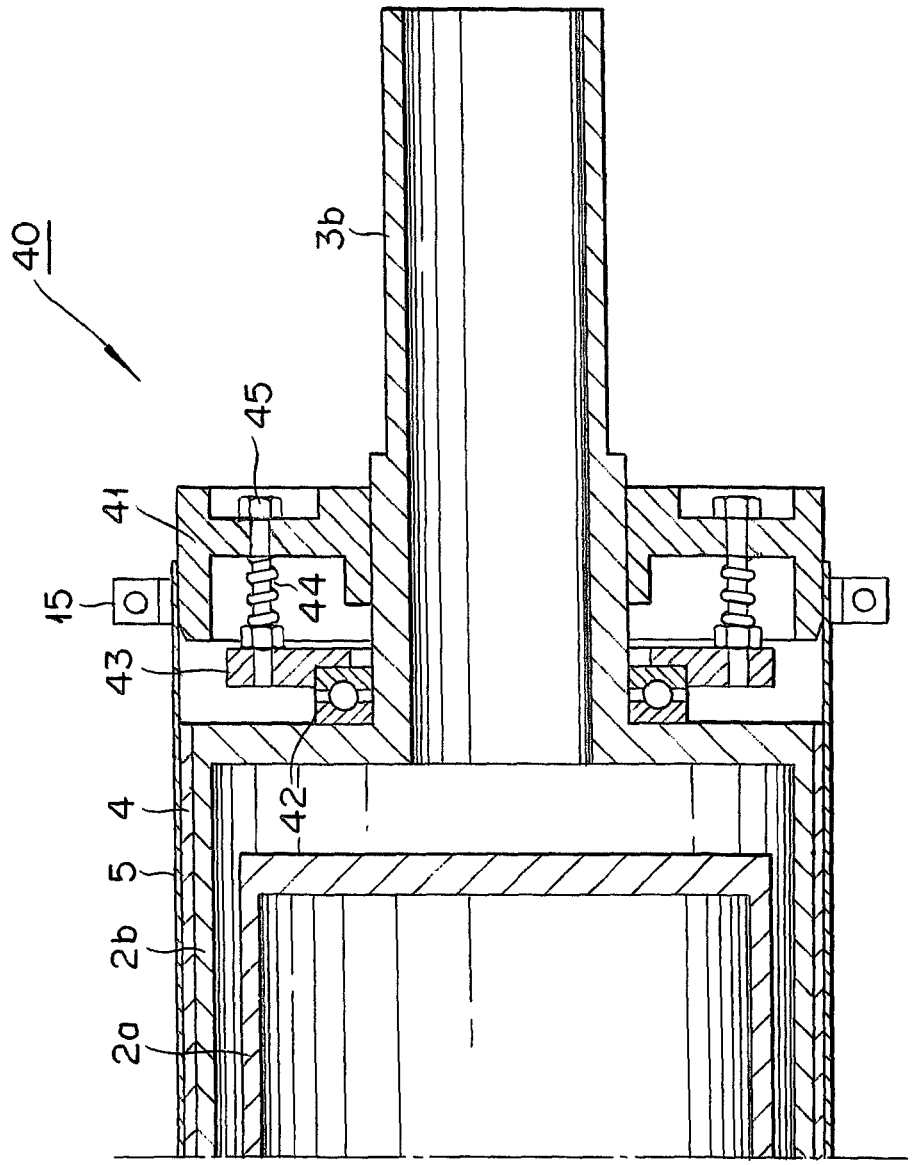
FIG. 4 is a cross-sectional drawing of the particular sleeve roll equipped with the rotary offset absorption device.

The crosswise offset prevention device 11 is provided between the shaft core part 2 and the sleeve 5. As shown in FIG. 3, both ends of the metallic roll outer tube 2b that constitutes the shaft core part 2 are provided with slim tubular support shafts 3a and 3b, which each of the support shafts 3a and 3b are attached with coil tension springs 12a and 12b, and tension adjust members 13a and 13b having a rectangular cross-section covering the tension springs 12a and 12b respectively. The tension springs 12a and 12b are affixed by a plurality of bolts 14 so that the inner edges of the tension adjust members 13a and 13b maintain a specified gap 6 relative to both ends of the metallic roll outer tube 2b respectively. Further, the tension spring 44 can be a single large tension spring 44 as shown in the diagram, or can be a plurality of springs each attached to a bolt as shown in FIG. 4.

The edges of the sleeve 5 extend in the axial direction over both ends of the metallic roll outer tube 2b as far as to reach the tension adjust members 13a and 13b and are affixed by the ring-shaped holding collars 15 provided on the peripheries of the open ends of the tension adjust members 13a and 13b. The holding collar 15 is provided to affix the sleeve 5 to the tension adjust members 13a and 13b by tightening both ends of the semi-circular thing ring shapes by the bolts.

When the sleeve 5 moves in the horizontal direction (axial direction), i.e., in the crosswise direction, together with the tension adjust members 13a and 13b during its use, one of the tension springs, e.g., 12a (or 12b), expands while the other tension spring 12b (or 12a) contracts, and both tension springs 12a and 12b try to restore their original conditions, so that the movement of the sleeve 5 in the horizontal direction gets restricted. Thus, the crosswise offset prevention device 14 preserves as a so-called horizontal damper.

The rotary offset absorption device 40 is provided between the shaft core part 2 and the sleeve 5 to absorb the positional offset of the sleeve 5 relative to the rubber roll 4 in the rotary direction due to the heat expansion caused by the heat of the material to be formed.

As shown in FIG. 4, the rotary offset absorption device 40 is equipped with the sleeve fixing collar 41 mounted rotatably around the tubular support shafts 3a and 3b formed on both ends of the shaft core part 2, the rotary displacement plate 43 placed against the end face of the shaft core part 2 via the bearing 42, the tension springs 44 provided between the sleeve fixing collar 41 and the rotary displacement plate 43, and the bolts 45 screwed into the rotary displacement plate 43 going through the sleeve fixing collar 41 in order to hold the tension springs 44 in place.

In attaching the sleeve 5 to the shaft core part 2, the nuts are turned first relative to the bolts 45 to compress the tension springs 44, and the sleeve fixing collar 41 is set against the tubular support shafts 3a and 3b. Then the ends of the sleeve 5 are fixed on the sleeve fixing collar 41 by tightening the retention collar 15. The tension of the tension spring 44 is applied on the sleeve 5 by loosening or removing the bolts 45. The tension spring 44 can be either a plurality of springs mounted on the bolts 45 as shown in FIG. 4, or can be a single large tension spring 44 as shown in FIG. 3.

When the sleeve 5 develops an offset relative to the rubber roll 4 in the rotary direction of the sleeve roll 1 as the sleeve 5 expands thermally due to the heat of the material to be formed during the operation, the sleeve fixing collar 41 and the rotary displacement plate 43 rotates relative to the rubber roll 4 to absorb the offset in the rotary direction. The offset rotation of the sleeve fixing collar 41 can be made lightly and smoothly as a thrust bearing 42 is provided between the end face of the shaft core part 2 and the rotary displacement plate 43.

When no offset develops for the sleeve 5 in the rotary direction, the sleeve fixing collar 41, the rotary displacement plate 43 and the bolt 45 operate integrally with the sleeve 5 and the shaft core part 2 due to the tightening of the retention collar 15.

While there are several methods of producing such a sleeve roll 1, the first step typically is to form the shaft core part 2 in which the thermal medium passage P is provided between the metallic roll inner tube 2a and the metallic roll outer tube 2b. It is preferable to form the rubber roll 4 by wrapping a rubber material around the shaft core part 2 thereafter.

The thin-walled tubular metallic sleeve 5 is then fitted on the outside of the rubber roll 4. By this way, it is possible to fit the sleeve 5 on the outside of the rubber roll 4 without causing any damage.

INDUSTRIAL USE OF THE INVENTION

The present invention can be applied to the sleeve roll used for the extrusion film sheet forming apparatus and the lamination pinching apparatus used for forming synthetic resin film sheets.

The present invention is based on the Japanese Patent Application No. 2009-176486 filed on Jul. 29, 2009, and the entirety of the contents of said disclosure is incorporated into the present application by its reference.

What is claimed is:

1. A sleeve roll comprising:
   a shaft core part having a dual tubular structure that includes a metallic roll inner tube, a metallic roll outer tube, and a thermal medium passage formed between said metallic roll inner tube and said metallic outer tube to allow a thermal medium to flow therethrough;
   a rubber roll having an inner surface and an outer surface, the inner surface contacting an outward-facing surface of said shaft core part;
   a thin-walled tubular metal sleeve fitted on the outer surface of the rubber roll;
   a crosswise offset prevention device positioned between said shaft core part and said sleeve such that the sleeve is automatically repositioned to its original position for any offset of said sleeve in the horizontal direction; and
   a rotary offset absorption device positioned between said shaft core part and said sleeve such that any offset of said sleeve in the rotary direction of said sleeve relative to said shaft core part is absorbed, the rotary offset absorption device having a sleeve fixing collar mounted rotatably on a tubular support shaft formed on each end of said shaft core part, a rotary displacement plate facing against an end face of said shaft core part via a bearing, and a tension spring between the sleeve fixing collar and said rotary displacement plate, the tension spring fixed by bolts that are inserted through said sleeve fixing collar.

2. The sleeve roll of claim 1, wherein said rubber roll has a heat conductive material mixed therein.

3. The sleeve roll of claim 1, wherein the sleeve is affixed to the sleeve fixing collar via a ring-shaped retention collar.

4. The sleeve roll of claim 3, wherein said rubber roll has a heat conductive material mixed therein.

* * * * *